Aug. 25, 1964 R. C. SABINS 3,146,182

ELECTROLYTIC SYSTEM

Filed Aug. 25, 1959 9 Sheets-Sheet 1

INVENTOR.
ROLLAND C. SABINS

BY Fulwider, Mattingly & Huntley

ATTORNEYS

*INVENTOR.*
ROLLAND C. SABINS
BY Fulwider, Mattingly & Huntley
ATTORNEYS

Aug. 25, 1964 R. C. SABINS 3,146,182

ELECTROLYTIC SYSTEM

Filed Aug. 25, 1959 9 Sheets-Sheet 3

INVENTOR.
ROLLAND C. SABINS
BY Schneider, Mattingly & Huntley

ATTORNEYS

INVENTOR.
ROLLAND C. SABINS
BY Lulwider, Mattingly & Huntley
ATTORNEYS

Aug. 25, 1964 R. C. SABINS 3,146,182

ELECTROLYTIC SYSTEM

Filed Aug. 25, 1959

9 Sheets-Sheet 5

INVENTOR.
ROLLAND C. SABINS
BY Fulwider, Mattingly & Huntley
ATTORNEYS

Aug. 25, 1964 R. C. SABINS 3,146,182

ELECTROLYTIC SYSTEM

Filed Aug. 25, 1959 9 Sheets-Sheet 6

*INVENTOR.*
ROLLAND C. SABINS
BY Fulwider, Mattingly & Huntley
ATTORNEYS

INVENTOR.
ROLLAND C. SABINS
BY Fulwider, Mattingly & Huntley
ATTORNEYS

Aug. 25, 1964 R. C. SABINS 3,146,182

ELECTROLYTIC SYSTEM

Filed Aug. 25, 1959 9 Sheets-Sheet 8

INVENTOR.
ROLLAND C. SABINS
BY Schneider, Mattingly & Huntley

ATTORNEYS

Aug. 25, 1964 R. C. SABINS 3,146,182
ELECTROLYTIC SYSTEM
Filed Aug. 25, 1959 9 Sheets-Sheet 9

INVENTOR.
ROLLAND C. SABINS
BY Schneider, Mattingly & Huntley
ATTORNEYS

United States Patent Office 3,146,182
Patented Aug. 25, 1964

3,146,182
ELECTROLYTIC SYSTEM
Rolland C. Sabins, 522 Catalina Blvd., San Diego 6, Calif.
Filed Aug. 25, 1959, Ser. No. 835,952
4 Claims. (Cl. 204—197)

The present invention relates to cathodic protection of metals and more particularly to apparatus for prevention of corrosion of metals. The present invention is a continuation-in-part of my co-pending application, Serial No. 813,734, filed May 18, 1959, now abandoned.

As is well known, the metal, which is to be protected cathodically, must be elevated to above its dissolution potential. Also, as is well known, such systems employ anodes which are immersed in the same electrolyte in which the metal, to be protected, is immersed.

The present invention, while not limited thereto, is shown as applied for protecting, cathodically, the tanks of tanker ships. Here the anodes are disposed near the bottom of the tank. In one embodiment, I employ fixed resistances, one for each anode of an anode array. One end of each resistance is connected directly with the anodes and the other ends of each are connected with a common conductor for all anodes; the other end of the conductor is connected to the deck of the ship; the upper ends of the tanks are connected electrically with the deck. In another embodiment, no such resistance is employed but like, in the first mentioned embodiment, the end of the conductor is connected to the deck of the ship. I have discovered that such conductors need not be encased in insulating material, as was heretofore deemed necessary.

In the present invention, the anodes employed are higher in the electrochemical series than the metal, which is to be protected, which latter metal will be hereinafter referred to, at times, as the cathode.

The present invention contemplates an improvement in the shape and design of the anodes of an anode array. More particularly, the present invention provides an anode design in which its surface area, which is exposed to sea water, is in the order of between 2.2 to 3.7 times the mass of the anode. Specifically the anode is provided with fins so designed as to give the relation of area and mass in accordance with the above formula. As an example, an anode of one hundred cubic inches should have between two hundred and twenty to three hundred and seventy square inches exposed to the sea water.

In one embodiment of the invention, the anode includes a plurality of parallelly arranged disc-like sections and an integral core section joining said disc-like sections. And specifically, the disc-like sections taper in cross-section from the core section to the peripheries thereof.

The anode assembly of the present invention includes a core, usually formed of steel, and an anode attached to and surrounding the core, such anode being of metal which is higher in the electrochemical series than the core, for example, zinc, zinc alloys, magnesium, magnesium alloys. This assembly should be attached to but electrically insulated from the cathode. In one embodiment of the present invention, the core extends beyond the ends of the anode. Two spaced supports are attached to the cathode and each contains a tubularly shaped insulator, formed of for example nylon, which receive the ends of the core and insulate the core from the supports. One of these supports is provided with an opening in the side thereof for receiving sidewise one end portion of the core. After one end of the core is placed in position in one of the tubularly shaped insulators, the other end is moved into position through the opening on the side of the other support, and then the other tubularly shaped insulator is placed in position over the said other end of the core and into the said other support.

A stationary conductor is spaced from the said other end of the core a distance at least equal to the length of the insulator so that the insulator can be removed without moving the stationary conductor. In this manner, the core and what remains of the anode can be removed readily and a new anode assembly can be attached readily.

In such system in which a fixed resistance is interposed between the anode and the cathode, I provide an assembly including a casing containing the resistance embedded in insulating material. This unit or assembly is interposed and fastened between an end of the core of the anode assembly and the aforementioned stationary conductor.

In the embodiments illustrated, these stationary conductors, one for each anode assembly, are immersed in the electrolyte and each is connected to a conductor bar, which latter is also immersed in the electrolyte. In the use of the invention in a tank of a tanker ship, the aforementioned bar extends horizontally and merges into a bar conductor which extends vertically and the upper end thereof is connected to a part of the ship which is remote from the tank, for example to the steel deck.

While there are many uses for the present invention, the same is illustrated as applied to a tank of a tanker. In one embodiment, fixed resistances are disposed between each of the anodes and the cathode, and, in another embodiment, the invention is illustrated as applied to a system in which an extraneous source of direct current is impressed on the cathode and in which system the anodes and cathode are maintained at substantially like potential at all times. Such system is more specifically defined in my co-pending application, aforementioned.

Further objects and advantages will be apparent from the following description, reference being had to the accompanying drawings wherein preferred embodiments of the invention are illustrated.

Referring more in detail to the drawings, as previously set forth the present invention has many applications and for illustrating several forms of the invention I have illustrated the same in FIGS. 1 to 14 inclusive and 18 as applied to a tanker type of ship. Inasmuch as the present invention is a continuation-in-part of my co-pending application Serial No. 813,734, above identified, like numerals are employed to indicate like parts in the aforementioned filed application and this application.

Figure 1:
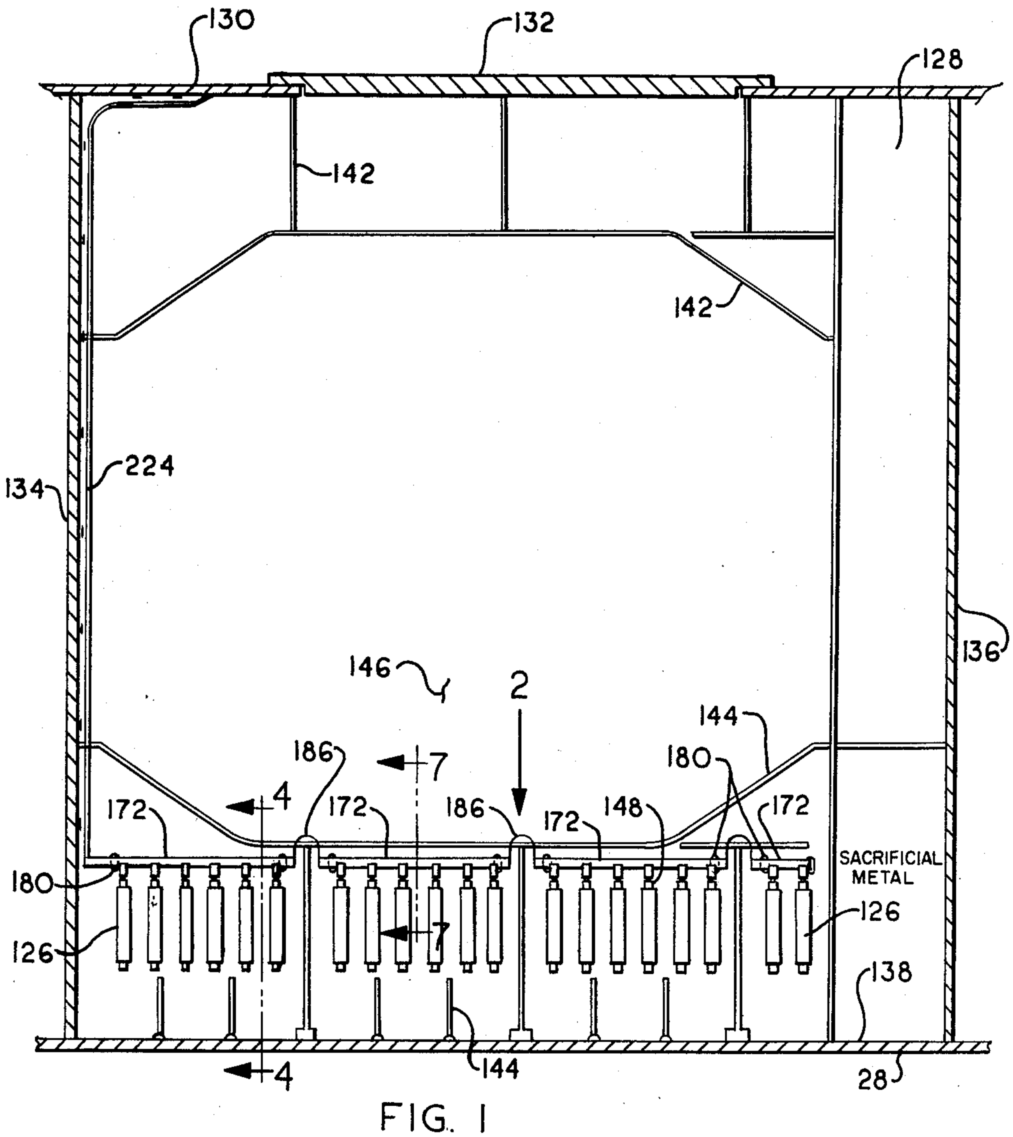
FIG. 1 is a fragmentary cross-sectional view of the hull of a ship of the tanker type showing a tank therein and showing one form of the invention applied thereto.

Referring particularly to FIG 1, the ship's hull is indicated at 28, a tank at 128, a ship's deck at 130 and the cover for the tank at 132. An anode array includes a plurality of anode assemblies 126.

The bulkheads are indicated at 134 and 136, and the floor of the hull is indicated at 138. The bulkheads 134 and 138 and the deck 130 and cover 132 provide tanks one of which is shown at 128. Reinforcing webs 142 are disposed at the top of the tank 128. Like webs 144 extend from the side walls of the tank and the floor 138 of the tank.

In the instant embodiment all the anode assemblies 126 are disposed along one of the walls 146 of the tank. Each of these anode assemblies includes a steel core 148 which is surrounded by the anode 26. As will be more clearly set forth hereinafter, the anode material may be zinc, zinc alloys, magnesium or magnesium alloys, which is cast about the core 148. The lower end 150 of the core 148 extends below the anode 26 and the upper end 152 extends above the anode. The wall 146 is provided with a series of supports 154 which are spaced horizontally from one another and which supports will be referred to as lower supports, and the wall 146 is also provided with a plurality of upper supports 156 which are likewise spaced horizontally from one another. The supports 154 include a cylindrical socket 158 formed of steel, each of which is supported by a bracket of steel 160, the bracket being welded to the socket 158 and to the wall 146. The support 156 is similar to the support 154 but differs therefrom in that the socket 162 thereof is provided with a slot 164 in the front thereof having a width at least equal to the outside diameter of the core 148 as is more clearly shown in FIG. 11. Each of the sockets 158 and 162 carries a tubularly shaped insulator 166 having an enlarged head 168 which rests upon the top of the sockets 158 or 162. Shoulders 170, in the form of washers, are welded to the core 148, and the anode 26, of an anode assembly 126, disposed between these two shoulders.

In mounting the anode assembly, the insulator 166 is first placed in position in the socket 158 and the lower end of the core 150 is lowered into the insulator. The upper end 152 of the core is then placed in the socket 162 through the slot 164. Thereafter the insulating tube 166 is placed about the upper end of the core 152. It will be observed from FIG. 5 that the anode assembly rests upon the lower shoulder 170.

The anode assemblies 126 are each connected to one of a plurality of steel conductor bars 172. These conductor bars 172 are carried by the wall 146 as is more clearly shown in FIG. 7. It will be seen from this FIG. 7 that vertically extending metallic straps 174 are welded to the wall 146. Bolts 176 have their head ends welded to the straps 174 and these bolts support insulating washers 178 and a strap 180. The strap 180 is insulated from the bolts 176 by tubular shaped insulators 182. The strap 180 is held in insulated relationship with the wall 146 by the nuts 184. A plurality of such supports are provided and the bars 172 are welded to the straps 180.

Figure 2:
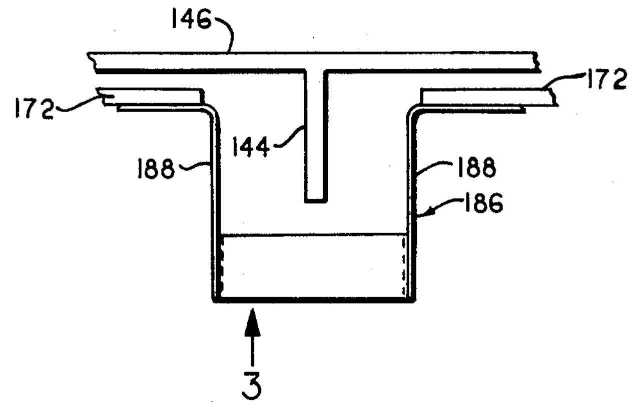
FIG. 2 is a fragmentary view locking in the direction of arrow 2 of FIG. 1 but on a larger scale.
Figure 4:
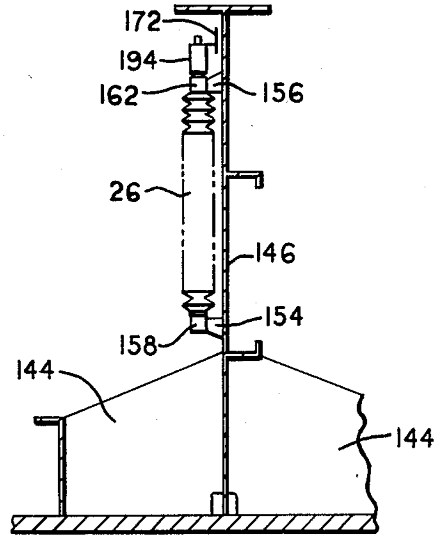
FIG. 4 is a fragmentary sectional view taken along line 4—4 of FIG. 1.
Figure 3:
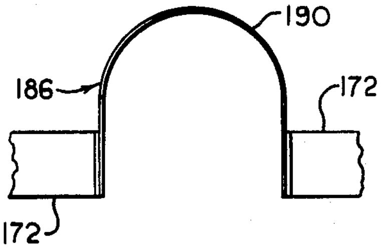
FIG. 3 is a fragmentary view looking in the direction of arrow 3 of FIG. 2.

As is more clearly shown in FIGS. 2 and 3, these horizontally disposed bars 172 are connected in series circuit relationship by metallic jumpers 186. The ends of these jumpers are connected by welding to the ends of adjacent bars 172. These jumpers extend inwardly as at 188, then upwardly as at 190 so as to jump over the webs 144. These jumpers 186 are of course formed of steel.

Figure 5:
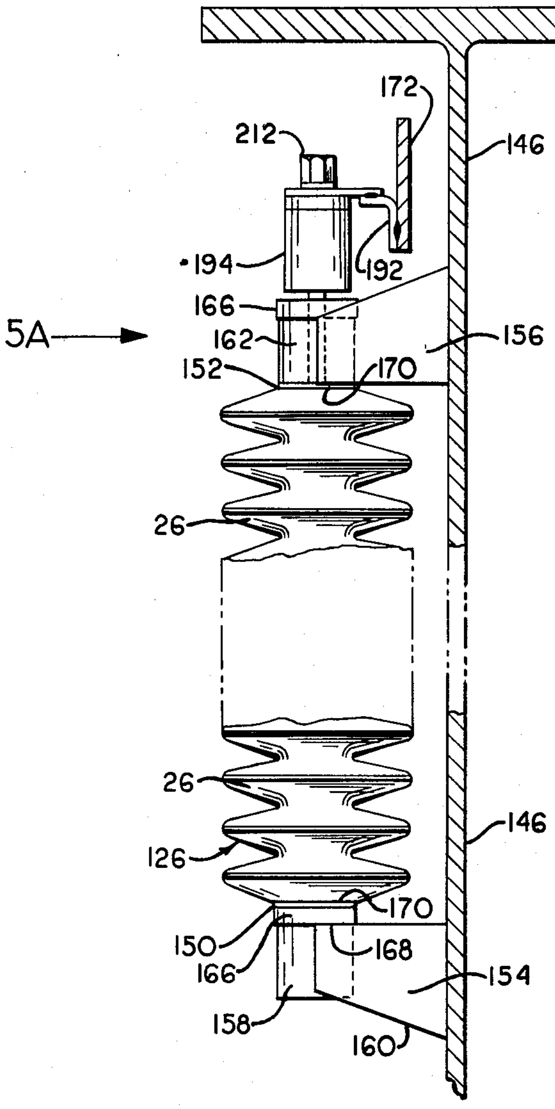
FIG. 5 is a view similar to FIG. 4 but showing the upper part of FIG. 4 and on a larger scale.
Figure 5A:
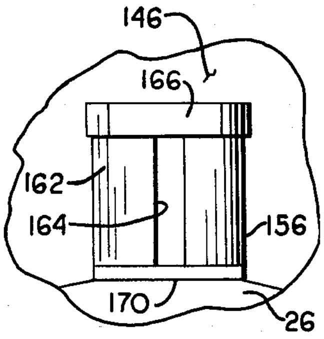
Figure 6:
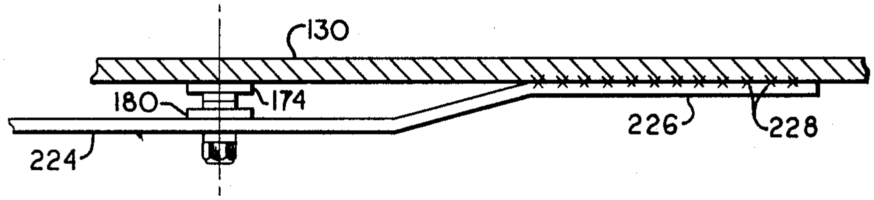
FIG. 6 is a fragmentary view, on a larger scale, of the upper left hand portion of FIG. 1.

The bars 172 have welded thereto inwardly extending conductors 192 directly above each of the anode assemblies 126 as is more clearly shown in FIG. 5 A resistance unit or assembly 194 is interposed between the top end 152 of the core 148 and is connected with the conductor 192. This resistance unit is more clearly shown in FIG. 11. This resistance unit includes a lower collar 196 and upper collar 198, an insulating tube 200 which is suitably attached to the two collars, and a surrouding sleeve 202. The tube 200 and the sleeve 202 may be formed of nylon. The sleeve 202 is spaced from the tube 200 so as to receive a resistance element 204. One end of this resistance element is secured by silver solder to the brass collar 196 and the other end of this resistance element is secured to the brass collar 198 by silver solder. After the resistance is placed in position the space between the sleeve 202 and the tube 200 is filled with a versamid and epoxy 206 so as to permanently seal the resistance in position. A brass conductor 208 is suitably brazed to the upper surface of the collar 194. This conductor 208 is provided with an opening 210 which is concentric with the openings in the collars 196, 198, and the tube 200. This resistance unit 194 is held in position on the upper end 152 of core 148 by a bolt 212 which is threaded into a brass bushing 214 which had been hermetically joined with the upper end 152 of the core 148. The bolt 212 is insulated from the collar 198 and conductor 208, there being a space between the inner periphery of the collar 198 and the outer periphery of the bolt, and a tubular insulator of nylon 216 is disposed between the bolt and the conductor 208. In this manner the electrons flowing from the anode assembly must pass through the resistance 204. Of course these resistances 204 are of such value to provide the proper potential at the cathode.

Thus it is apparent from the foregoing that each of the anode assemblies may be readily electrically connected to the bars 172, for it will be seen that after the assembly 126 is placed in position the resistance unit 194 can be attached by merely placing the same in position, tightening bolt 212; the brass conductor was previously silver soldered to the steel conductor 172. In replacing an anode assembly, it is necessary only to remove the bolt 212; then the resistance unit 194 can be removed. The vertical distance between the upper end 152 of the core 148 and the lower part of conductor 172 is at least as great as the vertical length of the tubular insulator 166, whereby upon lifting the insulator 166, it will clear the upper end 152 of the core and therefore can be removed, permitting the core to be moved to the left as viewed in FIG. 11, whereby the assembly can be removed and replaced. Of course, in reassembling the new anode assembly, after the core is placed in the position shown in FIG. 11, then the insulator tube is dropped down into the socket 162 to the position shown in FIG. 11, and thereafter the resistance unit 194 is added as previously explained.

As will appear more fully hereinafter, in some types of system, the resistance unit 194 is not used, but in its stead there is employed a spacer 218 formed of brass and which is bolted to the conductor 208 by the bolt 212.

Figure 14:
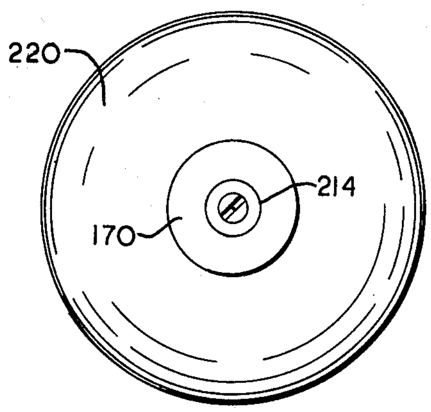
FIG. 14 is a top plan view of the anode assembly.
Figure 13:
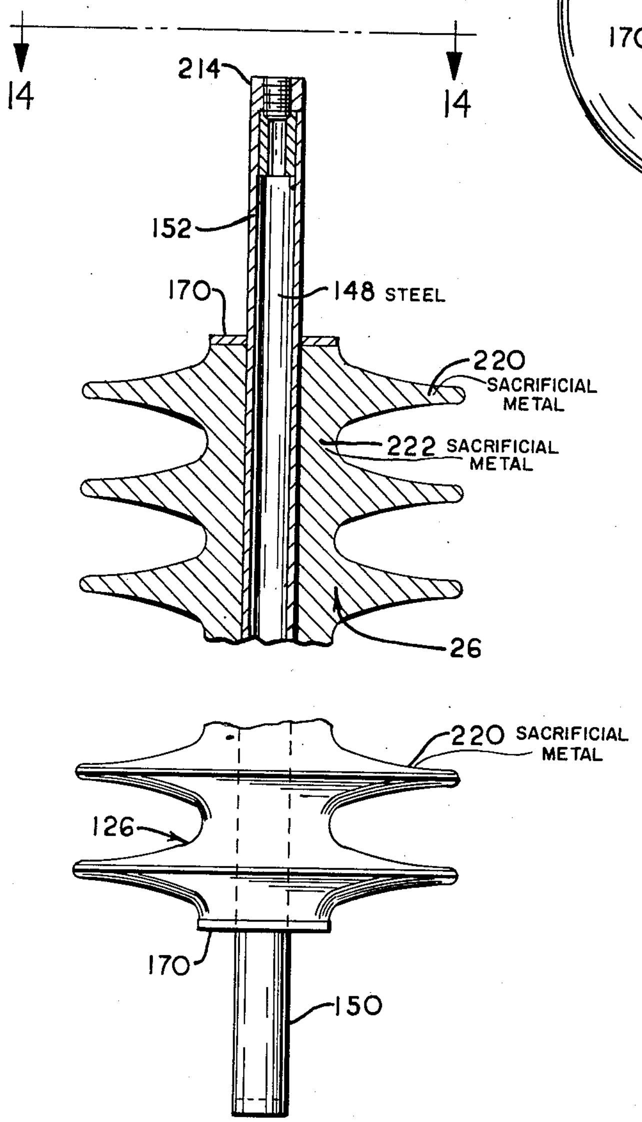
FIG. 13 is a front view of one form of anode assembly as employed in FIGS. 1 and 9.

The anode assemblies 126 employed are more clearly shown in FIGS. 13 and 14. The core 148 is in the form of a pipe and the bushing 214 is suitably welded or brazed at the end 152 of the core. As previously set forth, the anode 26 may be zinc or magnesium, or alloys of zinc or alloys of magnesium. This anode material is cast between the permanently attached steel shoulders or washers 170. The number of anode assemblies employed is of course computed upon the square feet of cathode surface which is to be protected. I have found that by using zinc anode surface of 1,000 square inches I can protect 1,000 square feet of surface at an average of 900 millivolts for a period of two years when the electrolyte is sea water.

It will be observed from FIGS. 13 and 14 that the anode is shaped to provide a series of circularly shaped disc-like sections 220 which are integrally joined with one another by a core section 222. These disc-like sections 220 are tapered in cross-section from the core section to the peripheries thereof. By so shaping the anode, I have found that the anodes are sufficiently effective to impose the potential of the cathode above dissolution potential for a period of two years or more. I have found that the dissolution of the anode material takes place slower progressively outwardly, i.e., the diameter of the disc-like sections is maintained more constant than the other parts of the anode. More specifically the dissolution horizontally is at a lower rate than the dissolution vertically when the axes of the cores 148 are in a vertical plane. It will of course be understood that the pitting that takes place also compensates in increasing the surface area while other dissolution is taking place.

Figures 7, 8:
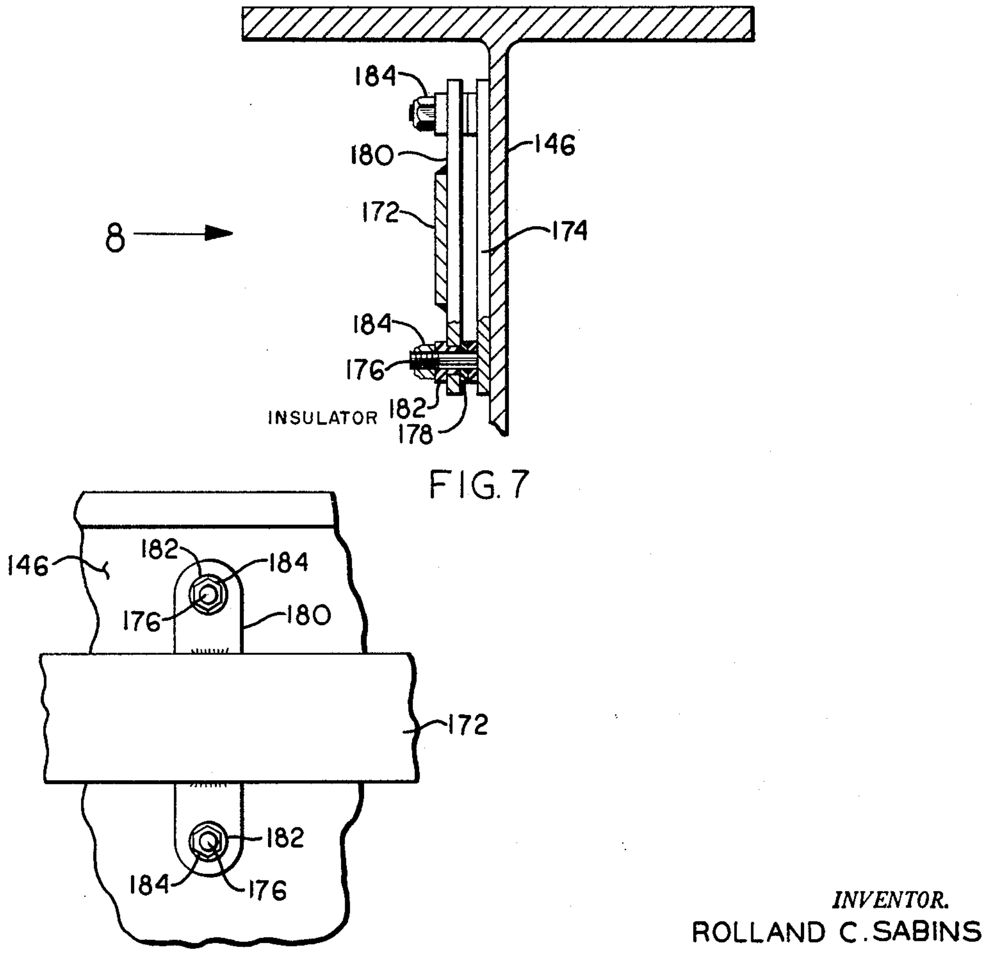
FIG. 7 is a fragmentary sectional view taken along line 7—7 of FIG. 1 but on a larger scale.
FIG. 8 is a view looking in the direction of arrow 8 of FIG. 7.
Figure 9:
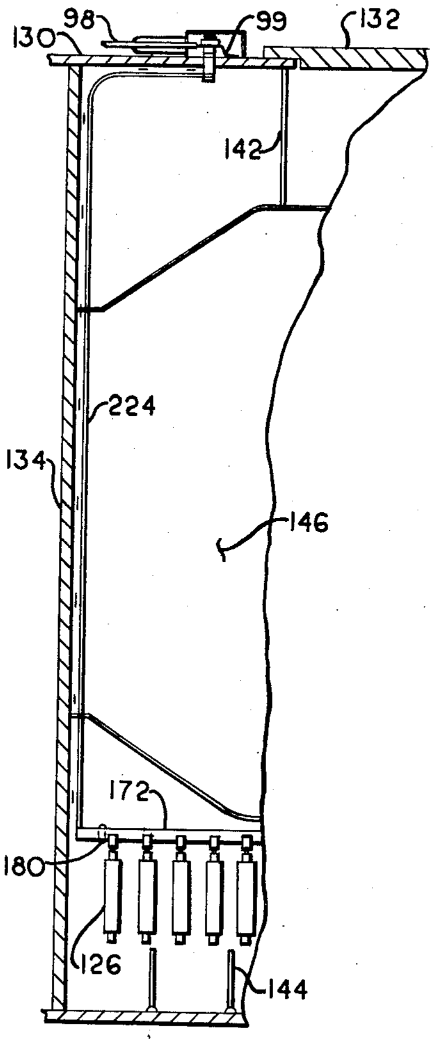
FIG. 9 is a view similar to FIG. 1 but showing another embodiment of the invention.
Figure 10:
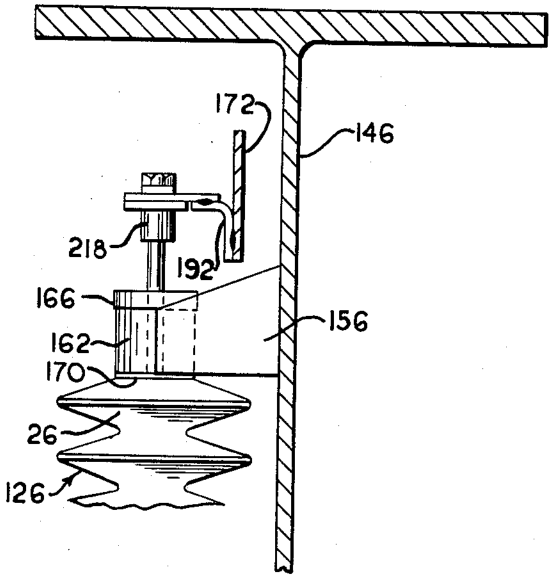
FIG. 10 is a view similar to FIG. 5 but showing detail of the embodiment of FIG. 9.
Figure 11:
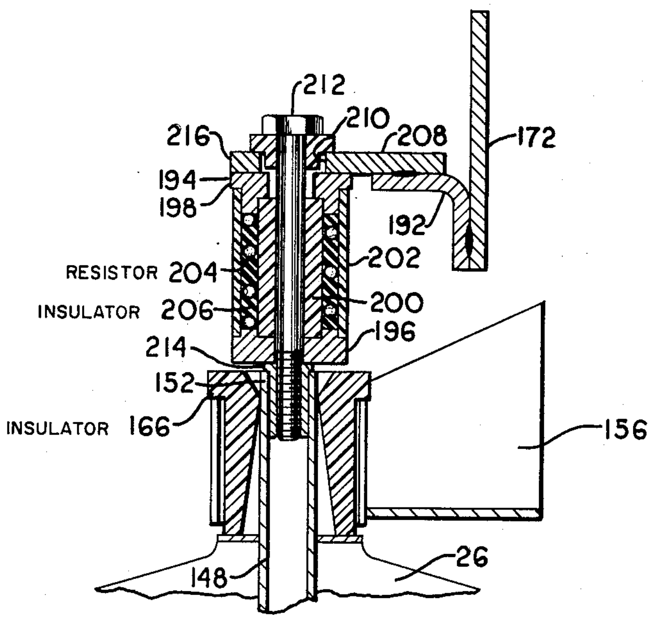
FIG. 11 is a fragmentary view in cross-section of the upper part of FIG. 10 but on a larger scale.
Figure 12:
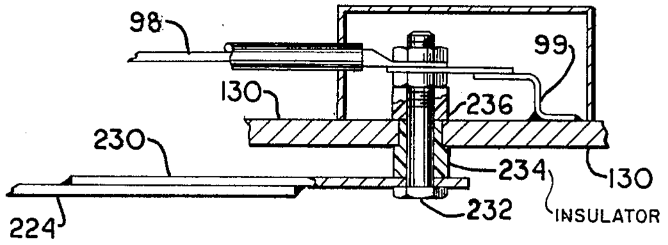
FIG. 12 is a fragmentary view of the upper left hand corner of FIG. 9 but on a larger scale.

In both embodiments of the invention as shown in FIGS. 1 and 9, at least one end of the bars 172 is connected to a vertically extending bar of steel 224 and to the side of the bulkhead 134, and this bar 224 is also insulated from the wall 134 in the same manner as described with respect to bars 172 and as illustrated in FIGS. 7 and 8.

In the embodiment shown in FIG. 1, the bar 224 extends to the deck 130 and has its end 226 suitably welded to the underside of the deck as shown at 228. In this embodiment of the invention the resistance units 194 are employed between each of the anode assemblies and the steel conductor bar 172. Such system is usually employed when magnesium or a magnesium alloy is used as the anode.

In the embodiment shown in FIG. 9, the bar 224 is welded to a conductor 230 to which a vertically extending bolt 232 is attached. This bolt extends through the deck 130 but is insulated therefrom by a nylon grommet 234 and nylon washer 236. This bolt in turn is connected to the conductor 98 which is the positive side of a source of direct current, as is more clearly shown in FIG. 18. This bolt also is directly connected by a short-circuiting conductor 99 to the deck 130. The direct current supply system is more fully explained in the aforementioned copending application and is also shown herein in FIG. 18.

The impressed D.C. power supply is through a power rectifier 16, the output of which is controlled by a current responsive device in the form of a coil 21 of a reference or monitoring circuit 20. The value of current passing through the coil 21 may be sufficient to more directly control the output of the rectifier 16, if so desired, however, in the preferred embodiment, I utilize a direct current responsive device shown as the coil 21, as part of a signal amplifier 10, which in turn is connected through a control reactor 12 and a power reactor 14 to the rectifier 16.

The impressed current supply means is connected between an anode array of anode assemblies 126, and the cathode which is the ship's hull and the tanks 128. The hull of course is immersed in sea water, and the tanks 128 at times contain sea water as a ballast. The ship's anode or anode array can be any suitable type which is higher in the electrochemical series than the steel.

The monitoring or reference circuit includes the electrolyte, the anodes, conductors 98 and 59, the current responsive device in the form of a coil 21, conductor 60, resistance 63, and conductor 67 which is connected to the cathode, that is to the ship's hull and the tanks.

In the embodiment shown in FIG. 9, the anode array including the assemblies 126, which for convenience will be hereinafter referred to as the anode, is preferably formed of zinc or zinc alloy, such as an alloy of magnesium and zinc, or an alloy of zinc and aluminum, or an alloy of magnesium, zinc and aluminum.

In the operation of the system, reference to current flow is intended to mean the direction of electron flow, and reference to electron flow in the electrolyte is intended to mean the direction of electron migration within the ion exchange phenomena. Also "cell resistance" is defined as follows:

"Cell resistance: The inherent resistance in a cell composed of two dissimilar metals electrically connected in the same electrolyte. Cell resistance is composed of three elements: Resistance from anode to electrolyte; resistance of electrolyte; and resistance from electrolyte to cathode. The unit of measure is ohms."

Obviously, the emission of electrons from the cathode to the electrolyte (herein sea water, or water which may leak into the tanks containing hydrocarbon fluids) represents the principal electrical load on the entire system, and such emission is continuous although the cathode is at the same potential level as that of the anode. The emission rate of this electron emission, from the surfaces of the cathode, is governed by the polarization level and environment, and also varies with velocity, temperature, ionic content of the sea water temperatures, condition of paint coatings and volume of electrolyte within the tanks, etc.

With respect to the impressed current system which is employed to maintain the potential of the cathode and the anode in equilibrium, any controllable source of direct current may be employed which may be manually controlled by controlling the flow of the extraneous source of direct current, but in the present embodiment I have illustrated a refined system in which the anode 126 is connected by a conductor 98 to the positive terminal 102 of the power rectifier 16, through the full wave bridge therein to the negative terminal 104 and thence by conductor 100 to the cathode 128. This impressed current is controlled by the reference current flowing through the coil 21 of amplifier 10; this amplifier 10 is supplied with power from a source of A.C. current 73. This A.C. input is controlled by the inpedance as a result of the A.C. winding on the reactor cores. The control A.C. is rectified and supplies the D.C. output. The direct current in coil 21 controls the degree of saturation of the cores in said amplifier 10, resulting in the control of the direct current output which is fed from a pair of direct output terminals 66 and 68 through a pair of conductors 70 and 72 to a pair of direct current input terminals 74 and 76 of the amplifier or control reactor 12 in direct accordance with the degree of saturation of coil 21. In the present embodiment, at full output, the incoming signal will fully saturate at 20 microamperes, in which case the amplifier 10 puts out a signal in excess of 300 microamperes.

Control reactor 12 which, like amplifier 10 is provided with power from a suitable 110 volt A.C. source 78, then amplifies the input signal in excess of 300 milli-amperes, which is fed through a pair of output terminals 80 and 82 and through a pair of conductors 84 and 86 and variable resistance 85 to the D.C. input terminals 88 and 90 of power reactor 14. The reactor 14, which is connected to a suitable 110 volt A.C. power source 92, further amplifies the signal, and this signal is fed to the A.C. input terminals 94 and 96 of power reactor 16. The A.C. input is then rectified to a direct current output which is connected to the anode 126 and cathode 128 by a pair of conductors 98 and 100, which in turn are connected, respectively, to the positive and negative output terminals 102 and 104 of rectifier 16.

The variable resistance 85 has a value of zero to 500 ohms and will govern the maximum output wattage of the power reactor, which in turn limits the maximum wattage output as desired of the A.C. to direct current rectifier, thus eliminating the need of tap adjustment in the power rectifier circuit.

The instruments 10, 12, 14 and 16 are more fully explained in my co-pending application Serial No. 734,322 filed May 9, 1958.

From the foregoing it will be seen that the amplifier 10, reactors 12 and 14, and rectifier 16 are, in effect, various stages of an amplification system for accepting a small D.C. input signal and applying it to a rather large direct current output signal. The direct current output signal comprises the impressed current for raising the electrical potential of cathode 128 to provide the necessary cathodic protection therefor and maintain the voltage potential of anode 126 and cathode 128 at the same potential level.

For reasons hereinafter more fully explained, I have found that I can permanently ground the anode and cathode and such ground is herein shown at 99.

It will be observed that the conductor 59, coil 21, conductor 60, resistance 63 and conductor 67 are in parallel circuit relation with the low resistance conductor 99. Consequently, to render the coil 21 effective, an electrical booster is necessary which may be any source of direct current such as a battery which will augment the current flowing through coil 21 from the anode 126 to the cathode 128. The booster herein shown is indicated at 22 comprising the direct current circuit which has been rectified by a full wave bridge 23 including the variable resistance 29 having one end connected to the positive side of the full wave bridge 23 and the conductor 60. The negative side of the bull wave bridge is connected to the wire 67 by conductor 24. Current is supplied to the full wave bridge through the secondary coil 25 of a transformer 27, the primary winding of which is shown at 31, which is connected with the source of 110 volt A.C. 33.

For illustrative purposes it will be assumed that coil 21 requires ten microamperes to maintain the balance in potential of the anode and cathode and that one more microampere flowing therethrough will effect a sizable increase in output of the power rectifier 16. The variable resistance 29 will have been adjusted so that the booster constantly provides the necessary ten microamperes. Assuming that the potential of the cathode 128 is at the desired level, for example at 900 millivolts with references to a silver-silver chloride electrode (not shown) and the anode 126 has been reduced from 1050 millivolts (that of a zinc alloy) to 900 millivolts to be in potential balance with the cathode, then in that event the electrons flowing through the coil 21 are sufficient and sufficient only to monitor the impressed current to cause the latter to withdraw electrons from the anode array at such rate as to maintain the potential of the anode and the cathode at the same level. However, as soon as there is the slightest drop in voltage potential at the hull, due to environment demands, i.e., as soon as there is an increased rate of emission at the cathode, such increase in rate of emission imposes an increased voltage potential across the cell (cathode 128 and anode 126) which in turn results in providing an increased flow of electrons through the coil 21, which in turn causes increased output of direct current by the rectifier 16 to lower the voltage potential of the anode by suction so that it is at the same potential as that of the tank 128. In other words, any substantially insignificant change of differential of potential is immediately sensed by the coil 21 so as to maintain the voltage potentials constant at the anode and the cathode (let it be understood that when the term "suction" is employed, I am referring to the positive side of direct current, and when the term "pressure" is employed, I am referring to the negative side of the direct current). In the instant case a variation in potential of one microampere will be sufficient to activate the coil 21 to increase the impressed current to the power rectifier 16, since the booster 22 supplies the necessary minimum saturation or the main current for energizing the coil 21.

The variable resistance 29 has an ohmic value of zero to 30,000 and the resistance 63 has a value of 2,000 ohms.

The purpose of the resistance 63 is to prevent or materially impede the flow of electrons from the cathode 128 by the operation of the booster 22 so that it in effect is operative substantially only for withdrawing electrons through the coil 21. Since there is no significant difference in potential between the anode and cathode, the electrolyzing of the electrolyte, which may develop by any substantially insignificant difference in voltage, is insufficient to cause evolution of gases. Also since there is no significant potential difference, an inadvertent or accidental short-circuiting of the anode or anode conductor and cathode will not create an electric arc.

The above described condition, employing the ground conductor 99, precludes the possibility of significant current flowing in either direction in the shorted ground, since the control function of the controller provides an absolute null resistance path to divert the electron flow through the controller with the exception of insignificant qualities of current that are bound to flow because of the existing value of the resistance parallel. Actual measurements have indicated that 95 to 98% of the total current passes through the conductor rather than the short to the hull when the system has reached a stabilized condition. Prior to this stabilized condition for a time interval measured in micro-seconds a small value of current flows from the cathode to the anode through the shorted conductor. At the absolute null potential balance, however, no current whatsoever passes through the shorted conductor but, as related, very small value of current will pass in one direction or the other in a slightly offset balance condition.

One of the major features obtained by being able to short the anode with the cathode by direct couple is that it becomes impossible to develop an open circuit potential on the zinc which could provide, under that condition, potential tensions sufficient to create an arc of sufficient value to cause explosion. The direct shorting of the anode precludes this remote possibility entirely as the existing potential between the anode and the hull must always remain at zero potential under any operative condition.

In addition to the prevention of evolution of gas and the prevention of the possibility of creating an arc, the ground will provide approximately 75% cathodic protection. This is important since the A.C. service supply may be rendered ineffective. This 75% protection will be maintained through the short of the direct couple system up to a period of approximately six weeks in a system in which the area to be protected is of approximately 20,000 square feet and the zinc anode has an exposed surface of approximately 210 square feet. At this time the zinc would tend to accumulate inhibitive coatings because of this very low value of resistance to its electron flows being present in the shorted conductor, and is responsible to a degree for the poor results that are ordinarily achieved with the conventional direct couple zinc employment.

In the square foot example heretofore given, by actual test, it was determined that approximately five milliamperes per square foot was momentarily required to elevate the potential of the steel to 960 millivolts with respect to a silver-silver chloride electrode. The current density requirement decreased in a relatively short period of time to a requirement of two and one-half milliamperes per square foot of steel surface. As the tendency of the cathode surfaces to accumulate mono-atomic layers of zinc products increases, the current density requirement was further reduced to approximately one and one-half milliamperes per square foot and thereafter remained fairly constant, subject of course to increased current requirements when the solutions were circulated and changed responsive to temperature changes of the solution.

Amplifier 10 is functionally responsive only to current in one direction which will be referred to as in the forward direction. It is important to note therefore, that current flowing in the opposite direction will be ineffective to saturate the coil 21 and, accordingly, no signal input will be made to amplifier 10 by reason of any such reverse flow. This is important, as will be seen, because if reverse flow of current through amplifier 10 would saturate the direct current input core thereof, which as stated is not the case, the impressed current supply means would be actuated and tend to raise the potential of cathode 128 to a still greater level. The reverse flow would then increase, and the system would be uncontrolled. For this reason, amplifier 10 is made to function or be actuated only by current in the forward direction, that is from terminal 62 to terminal 64.

It is to be understood that the value of the booster 22 can be such that sufficient amperage can be developed at coil 21 to cause the coil to control the power rectifier 16 directly through the power reactor 14, however, I prefer to provide the amplifier 10 and the control reactor 12 in addition to the power reactor 14 and power rectifier 16.

Although it was assumed that the potential of the cathode dropped to initiate the above operation, it will be appreciated that no appreciate drop will normally occur because the system maintains a continuous metering flow to cause equilibrium of voltage potentials at the anode 126 and the cathode 128. That is, the slightest fall in potential of the cathode, for example one millivolt, will be immediately corrected by increased actuation of the impressed current system through the varying of the current value in the coil 21 of the reference circuit 20.

The variable resistance 29 can be set to determine the value of the current flowing through coil 21 to that desired. The anode and cathode in all instances are tied together, that is including the reference circuit 20, by a solid state conductor of metal, as distinguished from being connected only through the electrolyte. Thus a complete metal loop is provided which cannot be disturbed functionally by an extraneous source of electrical energy, such as another electrolytic cell in the same electrolyte, as for example, the hull of an adjacent ship and its anode which may have a different potential level than that of the instant ship 28 being controlled by the present invention.

An advantage of the positively closed loop electrical circuits lies in the possibility of conservation of electrical energy and the detrimental surface reaction during the period of raising, materially, the potential level of the cathode from, for example, its normal static potential to that necessary to prevent dissolution in the electrolyte. It will be understood that time is a factor in increasing the polarization level of steel; for example on large ships, two days may be necessary to bring the hull from its static to its desired potential level. Too, ample power must be available at all times, at the rectifier 16, and ample anode surfaces must be available to raise the potential of the hull from its static level to that desired, During the period that the hull is being raised from its normal static low potential level to that level which is desired, there normally would be a tendency to impress current on the hull at a rate higher than true polarization can take effect, resulting in material loss of electrical energy and possible damage to the surface coatings, however, by the employment of the closed loop circuit, the value of the impressed current can be regulated automatically by the balancing effect of modulating the electron flow, part through the circuit including electrolyte 30, anode 126, conductors 98 and 59, coil 21, conductor 60, resistance 63 and conductor 67, and part through the circuit including electrolyte 30, anode 126, conductors 98 and 99, rectifier 16 and conductor 100. Whenever practical the potential levels of the cathode can be hastened by decreasing the resistance in variable resistance 29, resulting in causing more electrons to be available in energizing coil 21 of the reference circuit 20. After such hastening has been achieved the variable resistance is again readjusted, to increase the resistance thereof to that desired.

By way of further explanation of the system, in which the hull or the tank 128 and the anodes 126 were maintained at a constant potential equilibrium with an insignificant variation and below 860 to 940 millivolts balanced polarization in sea water, with respect to a reference electrode composed of silver-silver chloride (not shown): all references to polarization potentials are understood to be references to the silver-silver chloride type of references half-cell throughout these explanations. Presume the hull is a steel hull of approximately 20,000 square feet of wetted surface and the anode consists of 210 feet, to provide the necessary surface ratio to maintain an average optimum potential in sea water of approximately 960 millivolts polarization level on this hull lying at rest in sea water, such as at dockside, and approximately 860 to 900 millivolts potential depending on speed and other environmental influences while the same ship is under way. Before the system was energized, the anode would have a potential of approximately 1050 millivolts, it being a zinc alloy. Depending on the type and state of the coatings on the hull 28, and the anodic state of this hull, its polarization level would range anywhere between 400 millivolts and 630 millivolts.

To initiate the automatic operation of this system the resistance of resistor 29 would be increased to the maximum of 30,000 ohms which would prevent saturation currents to the coil 21. The A.C. switches for conductors 92, 78 and 73 would then be closed. Inasmuch as coil 21 is not energized, the impedance of the reactor 14 effectively blocks the A.C. to rectifier 16. By reducing the resistance value near zero ohms of resistor 29, permits immediate saturation of the magnetic amplifier 10 by the energization of coil 21. As previously described, this permits A.C. to flow through the primary windings of the rectifier 16, which in turn energizes the direct current output of the rectifier to impress current to the hull or tank 128.

It is now presumed that the hull or tank has reached a polarization level of 960 millivolts and the suction of the positive rectifier has pulled the anode 126 down to a balanced potential of 960 millivolts. At this time there is a balance of potential at the cathode and anode and the coil 21 will be energized only by the booster 22 which has been adjusted so as to require the addition of approximately one microampere of current from the anode to the cathode to increase the output of the power rectifier 16. Obviously then, if the potential of the hull drops below the 960 millivolt polarization level, the potential drop of the back E.M.F. exerted through conductor 60, permits current to again be supplied through the coil 21 by the anode 126, to effect the coil 21 to increase the direct current output of the rectifier through the control means which in turn lowers the potential of the anode 126 and raises the potential of the cathode 128 again to a potential balance. The resulting achieved potential of the hull will vary throughout a protected tolerance range of potential, depending on the galvanic and load imposed on the hull or tank 128 by the environment and the anode surface available. The potential levels would be approximately as previously described.

The polarization level above negative 800 millivolts is considered within the protective range when employing zinc as the anode and the zinc surface can be reduced to considerably below that of 105 square feet of wetted surface and still provide a normal potential balance of 800 millivolts level with respect to a silver-silver chloride electrode.

Although the possibility of shearing the conductor 98 is remote, nevertheless it is desirable to maintain the potential of the cathode at the same level as that of the anode, and for that purpose the ground conductor 99 is employed. Without the ground conductor 99, should the conductor 98 be rendered ineffective, the resultant broken circuit potential of the zinc anode could be sufficient to force a quantity of current at the instant of contact to provide an arc sufficient to detonate an explosive mixture of gases if such gases were present. Too, should this conductor 98 be severed or should there be a failure of alternating current, approximately 75% protection will be maintained through the short 99 as a direct couple system which would be effective up to a period of approximately six weeks. Under automatic control condition, it would be electrically impossible to provide a direct couple short of absolute null resistance value and the indefinite small resistance that still exists in the anode short, permits the automatic system to channel from 95 to 98% of the current through the anode conductor to the controller to hull, rather than through the direct couple short 99 to the hull.

As set forth in the aforementioned previously filed application Serial No. 813,734, actual measurements have indicated that 95 to 98% of the total current passes through the control conductor rather than the short to hull when the system has reached a stabilized condition. Prior to the stabilized condition, this correspondingly small value of current has a reversed direction and is flowing from the steel to the anodes through the shorted conductor because of the time factor of releasing the electrons from the zinc through suction effect by the extraneous D.C. current. In absolute null potential balance, however, no current whatsoever passes through the shorted conductor but, as related, very small value of current will pass in one direction or the other through the shorted conductor in the slightly off-balance conditions.

Thus, it is apparent from the foregoing that I have provided a system in which the voltage potential at the anode is in equilibrium with the voltage potential at the cathode. As previously set forth, no explosive gases are created nor can an arc be created by inadvertent or accidental short circuit of the cathode and anode even though the main control circuit between the anode and the power rectifier is sheared.

I have also found that the systems as herein shown and described are highly useful for marine structures and ships and can be used for cathodic protection of other structures such as underwater foundations, pipe line, storage reservoirs of steel construction and the like.

Also it is apparent that I have provided a system which fails safe in the event of failure for any reason whatsoever of the reference or monitoring circuit. Should there be a failure of the reference or monitoring circuit, the coil 21 will be de-energized rendering the power rectifier 16 ineffective. In this manner, paint stripping and other damage to the structure which would be caused by over-polarization, is prevented.

I have discovered that in either embodiment of the invention, shown in FIGS. 1 or 9, it is not necessary to use an insulatedly incased conductor 224 in the tank 128. In the embodiment shown in FIG. 1, the resistance 204 establishes the dividing point between the anode and the metals that are to be protected, i.e., the cathode; thus the bar 224 is part of the cathode which is connected to deck 130, remote from the anode. In this manner, the deck and that part of the tank 128, remote from the anode, namely, the top, are in effect, physically extended down to the anode. Although the bar 224 offers resistance to the flow of electrons, in the flow of electrons from the anode to the remote connection, and, although the deck and tank structure also offers resistance to the flow of electrons and such resistance increases progressively, from the junction of the bar 172 with the resistance 204, upwardly to the deck and downwardly through the tank, inasmuch as the bar 224, is connected remote from the anode and inasmuch as the electrolyte is a resistance, the resistance offered by the electrolyte obviously decreases progressively from the parts thereof most remote from the anode to that immediately surrounding the anode. It was found, in actual practice, that by such method and construction, the polarization level is constant throughout the entire surface of the tank, and the metal of conductors 172 and 224 are directly exposed to the electrolyte.

A system such as that heretofore described is highly desirable over such system of the type wherein localized coupling is employed between the anode and cathode, since in the latter, polarization must depend on migration of electrons on the surface of the metal, and since such migration takes place radially from the couple, not only is there present a progressive increase of resistance to electron flow but also an increase in resistance offered by the electrolyte radially from the couple, resulting in decreasing gradient of polarization levels, radially from the couple of the anode and cathode.

In accordance with the present invention, the resistances offered by the metal are not cumulative with the resistance offered by the electrolyte as is the case in systems having localized couples of the anode and cathode, but, in the present invention, there is a balancing effect between the resistance offered by the metal and that offered by the electrolyte. Heretofore it was deemed necessary to employ an insulating encasement for the conductor connecting the anode and the cathode. Such insulation would eventually deteriorate and mix and had to be replaced. The deterioration and mixing of the insulation with the electrolyte, caused damages, for example, if the electrolyte is a fuel for jet engines, non functioning of the engines could occur readily.

Figure 18:
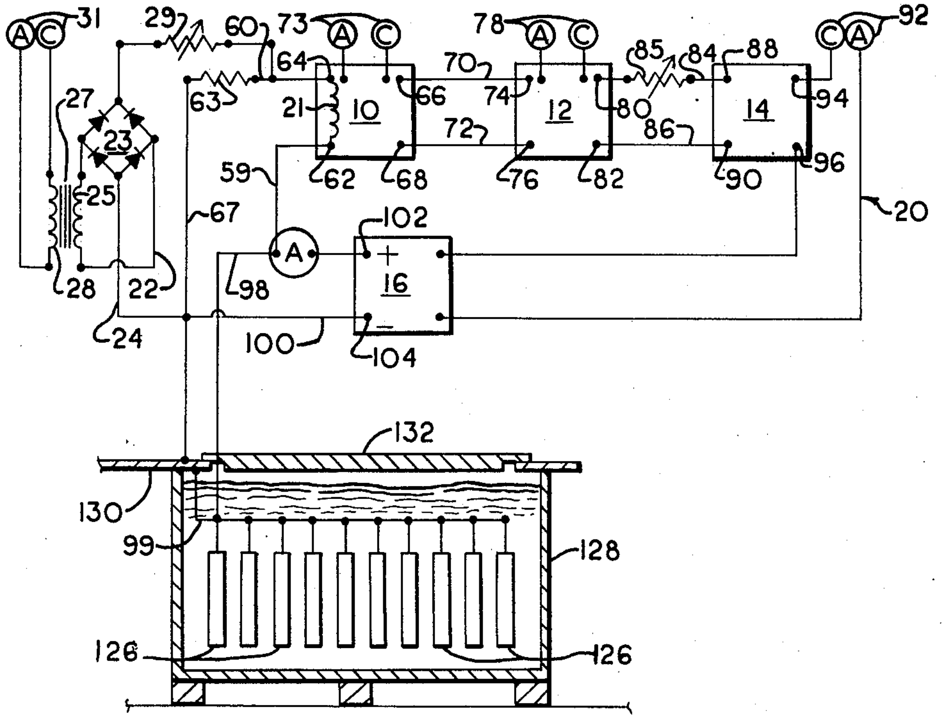
FIG. 18 is a diagrammatic view of the invention as employed in FIG. 9.

In the embodiment shown in FIGS. 9 and 18, the bar 224, being connected directly to bar 172 which in turn is directly connected with the anodes, functions as an anode, and here again, although the resistance of the metal increases progressively, the resistance offered by the electrolyte, decreases progressively from the parts thereof remote from the anode to that immediately surrounding the anode. Again it was found, in actual practice, that by such method and construction, the polarization level is constant throughout the entire surface of the tank.

Under certain conditions, it may be undesirable or inconvenient to utilize an anode having the diameter of the circular disc shown in FIGS. 13 and 14. For example it may be desirable to place a similar anode assembly on the outer side of the hull of a ship at the keel. Such anode may be then in the form of that aspect shown in FIGS. 15, 16, and 17. In this aspect of the invention the core 238 is again in the form of a pipe of steel. One or more straps or bars 240 are suitably attached to the core as by welding shown at 242. The anode 244 is cast about the core 238. Preferably the ends 246 of the core are flattened so as to prevent turning of the anode 244 about the core in the event there is dissolution of the anode material at the core. In this embodiment the disc-like sections 248 are substantially segment shaped as is more clearly shown in FIG. 17 and these disc-like sections are integrally joined with one another by the core section 250.

The supporting wall for the anode is shown at 252. A strap 254 is suitably welded to this wall 252 and has a bolt or bolts 256 welded thereto. The bar strap 240 is attached to the strap 254 but is insulated therefrom by nylon washers 258 and a nylon grommet 260. A nut 262 is screwed on to the bolt 256 to hold the bars 240 and likewise the anode assembly 264 in position. Each of the anode bars 240 have welded or brazed thereto a conductor 266 which is suitably connected in parallel circuit relationship with the conductor 268.

Figure 15:
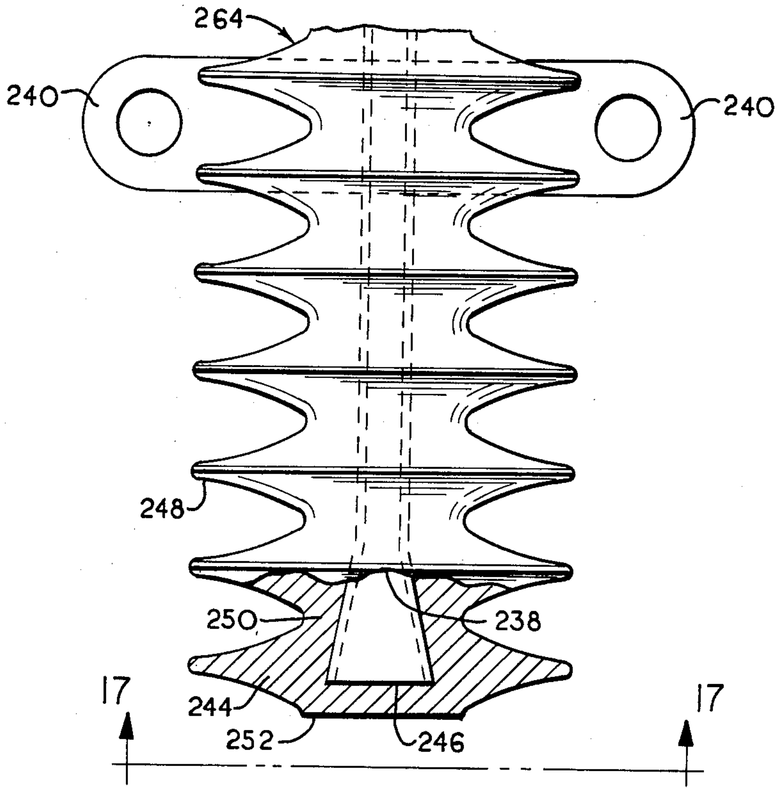
FIG. 15 is a side view of another form of anode assembly.
Figure 16:
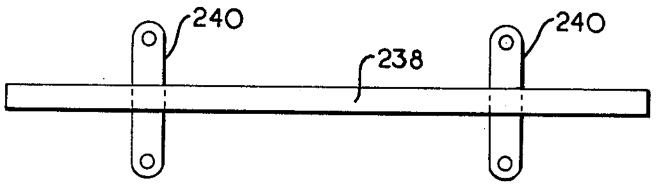
FIG. 16 is a top plan view of the mounting bracket for the anode assembly shown in FIG. 15.
Figure 17:
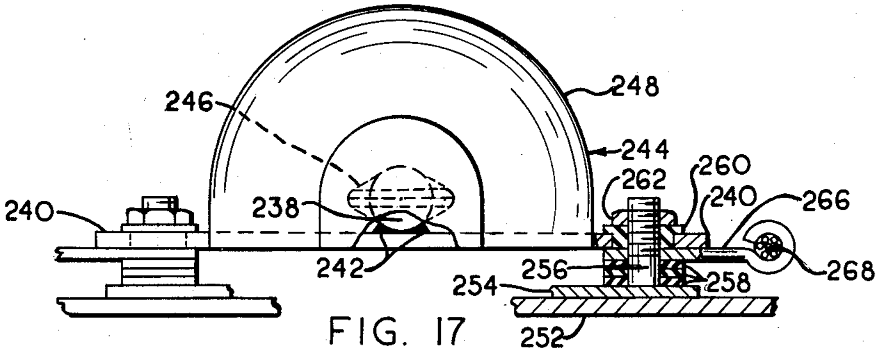
FIG. 17 is an end view of the anode assembly shown in FIG. 15.

The dissolution characteristics of this anode shown in FIGS. 15 and 17 are substantially the same as defined with respect to the anode shown in FIGS. 13 and 14.

While the forms of embodiments herein shown and described constitute preferred forms, it is to be understood that other forms may be adopted falling within the scope of the claims that follow.

I claim:

1. An anode and mounting therefor, comprising in combination, a vertically extending core formed of metal and having shoulders spaced vertically from one another, an anode of metal higher in the electrochemical series than the core and attached to and carried by the core between the shoulders of the core; a support formed of metal lower in the electrochemical series than the anode; an insulator having a shoulder resting on the support and having an opening, the lower end of the core being disposed in said opening and the lower of said shoulders resting on the insulator; a second support formed of metal lower in the electrochemical series than the anode disposed above the first mentioned support, said second support having an opening in a vertically extending side thereof for receiving the side of the opposite end portion of the core disposed above the upper of said shoulders on the core; and a second insulator carried by the second support and having an opening for receiving the said opposite end portion of the core.

2. An anode and mounting therefor, comprising in combination, a vertically extending core formed of metal and having shoulders spaced vertically from one another, an anode of metal higher in the electrochemical series than the core and attached to and carried by the core between the shoulders of the core; a support formed of metal lower in the electrochemical series than the anode; an insulator having a shoulder resting on the support and having an opening, the lower end of the core being disposed in said opening and the lower of said shoulders resting on the insulator; a second support formed of metal lower in the electrochemical series than the anode disposed above the first mentioned support, said second support having an opening in a vertically extending side thereof for receiving the side of the opposite end portion of the core disposed above the upper of said shoulders on the core; and a second insulator carried by the second support and having an opening for receiving the said opposite end portion of the core; a stationary conductor disposed above the core and spaced vertically from the upper end of the core a distance at least equal to the vertical length of the second insulator; and a conductor attached to said upper end of the core and the stationary conductor.

3. An anode and mounting therefor, comprising in combination, a vertically extending core formed of metal and having shoulders spaced vertically from one another, an anode of metal higher in the electrochemical series than the core and attached to and carried by the core between the shoulders of the core; a support formed of metal lower in the electrochemical series than the anode; an insulator having a shoulder resting on the support and having an opening, the lower end of the core being disposed in said opening and the lower of said shoulders resting on the insulator; a second support formed of metal lower in the electrochemical series than the anode disposed above the first mentioned support, said second support having an opening in a vertically extending side thereof for receiving the side of the opposite end portion of the core disposed above the upper of said shoulders on the core; and a second insulator carried by the second support and having an opening for receiving the said opposite end portion of the core; a stationary conductor disposed above the core and spaced vertically from the upper end of the core a distance at least equal to the vertical length of the second insulator; and a resistance attached to said upper end of the core and the stationary conductor.

4. An anode and mounting therefor, comprising in combination, a vertically extending core formed of metal and having shoulders spaced vertically from one another, an anode of metal higher in the electrochemical series than the core and attached to and carried by the core between the shoulders of the core; a support formed of metal lower in the electrochemical series than the anode; an insulator having a shoulder resting on the support and having an opening, the lower end of the core being disposed in said opening and the lower of said shoulders resting on the insulator; a second support formed of metal lower in the electrochemical series than the anode disposed above the first mentioned support, said second support having an opening in a vertically extending side thereof for receiving the side of the opposite end portion of the core disposed above the upper of said shoulders on the core; and a second insulator carried by the second support and having an opening for receiving the said opposite end portion of the core; a stationary conductor disposed above the core and spaced vertically from the upper end of the core a distance at least equal to the vertical length of the second insulator; an assembly including a casing, a resistance in the casing, an insulating material in the casing embedding said resistance, a second conductor connected with one end of the resistance, a third conductor connected with the other end of the resistance; and means for attaching the second conductor with said other end of the core and for attaching the third mentioned conductor to the first mentioned conductor.

References Cited in the file of this patent

UNITED STATES PATENTS

| | | |
|---|---|---|
| Re. 13,652 | Frazier | Nov. 25, 1913 |
| 72,309 | Matthew | Dec. 17, 1867 |
| 669,922 | Gottlob | Mar. 12, 1901 |
| 901,809 | Harris et al. | Oct. 20, 1908 |
| 1,664,800 | Mills | Apr. 3, 1928 |
| 1,842,541 | Cumberland | Jan. 26, 1932 |
| 1,874,759 | Kirkaldy | Aug. 30, 1932 |
| 2,187,143 | Bary | Jan. 16, 1940 |
| 2,609,340 | McMahon | Sept. 2, 1952 |
| 2,740,757 | Craver | Apr. 3, 1956 |
| 2,743,227 | Waite et al. | Apr. 24, 1956 |
| 2,772,231 | Waite et al. | Nov. 27, 1956 |
| 2,805,987 | Thorn | Sept. 10, 1957 |
| 2,826,543 | Sabins | Mar. 11, 1958 |
| 2,838,453 | Randall | June 10, 1958 |
| 2,910,421 | Sabins | Oct. 27, 1959 |

FOREIGN PATENTS

| | | |
|---|---|---|
| 11,216 | Great Britain | May 14, 1906 |
| 683,629 | Great Britain | Dec. 3, 1952 |
| 721,712 | Great Britain | Jan. 12, 1955 |